United States Patent [19]

Nakatani et al.

[11] Patent Number: 5,107,511
[45] Date of Patent: Apr. 21, 1992

[54] METHOD OF STABILIZING LASER WAVELENGTH AND LASER DEVICE WITH STABILIZED WAVELENGTH

[75] Inventors: Hajime Nakatani; Yoshibumi Minowa; Hiromi Kaneko; Hitoshi Wakata; Kenyu Haruta; Haruhiko Nagai; Kenichi Yasuda; Hiroyuki Mukumoto, all of Amagasaki, Japan

[73] Assignee: Mitsubishi Denki Kabushiki Kaisha, Tokyo, Japan

[21] Appl. No.: 381,723

[22] PCT Filed: Oct. 28, 1988

[86] PCT No.: PCT/JP88/01102
§ 371 Date: Aug. 25, 1989
§ 102(e) Date: Aug. 25, 1989

[87] PCT Pub. No.: WO89/04075
PCT Pub. Date: May 5, 1989

[30] Foreign Application Priority Data

Oct. 28, 1987 [JP] Japan ................ 62-274579
Jan. 13, 1988 [JP] Japan ................ 63-6125
Jan. 13, 1988 [JP] Japan ................ 63-6126
Jan. 13, 1988 [JP] Japan ................ 63-6128
Jan. 18, 1988 [JP] Japan ................ 63-9043

[51] Int. Cl.$^5$ ............................ H01S 3/10
[52] U.S. Cl. ........................... 372/29; 372/32
[58] Field of Search .............. 372/32, 19, 20, 29, 372/31

[56] References Cited

U.S. PATENT DOCUMENTS

| | | | |
|---|---|---|---|
| 3,546,622 | 12/1970 | Peterson et al. | 372/20 X |
| 3,628,173 | 12/1971 | Danielmeyer | 372/20 |
| 3,676,799 | 7/1972 | Danielmeyer | 372/19 X |
| 3,967,211 | 6/1976 | Itzkan | 372/32 |
| 4,150,342 | 4/1979 | Johnson, Jr. et al. | 372/32 |
| 4,914,662 | 4/1990 | Nakatani et al. | 372/32 |
| 4,947,398 | 8/1990 | Yasuda et al. | 372/29 |
| 4,977,563 | 12/1990 | Nakatani et al. | 372/32 |

FOREIGN PATENT DOCUMENTS

| | | |
|---|---|---|
| 60-16479 | 1/1985 | Japan . |
| 62-37893 | 8/1987 | Japan . |
| 63-160287 | 7/1988 | Japan . |
| WO88/07276 | 9/1988 | World Int. Prop. O. . |

Primary Examiner—Georgia Y. Epps
Attorney, Agent, or Firm—Burns, Doane, Swecker & Mathis

[57] ABSTRACT

A method and apparatus for stabilizing the wavelength in a laser. The apparatus includes a first and second etalon for fine and rough tuning, respectively, of a laser oscillator. The output power and wavelength of the laser beam, for example, can be used to adjust these etalons to provide a constant output power and to counteract the change in etalon characteristics due to heat.

9 Claims, 13 Drawing Sheets

METHOD OF STABILIZING LASER WAVELENGTH AND LASER DEVICE WITH STABILIZED WAVELENGTH

FIELD OF THE INVENTION

This invention relates to a method of stabilizing laser wavelength and a laser device with stabilized wavelength.

BACKGROUND OF THE INVENTION

FIG. 1 is a structural view showing a conventional narrow bandwidth laser shown, for example, in a magazine called "CAN. J. PHYS. VOL 63 ('85) 214".

This FIG. shows a laser medium 1, a full reflection mirror 2, an incomplete reflection mirror 3, an etalon 4 for rough tuning, an etalon 5 for fine tuning and a laser beam 6.

A brief description of the operation of this laser follows. In FIG. 1 laser medium 1 is surrounded by a light resonator consisting of the full reflection mirror 2 and the incomplete reflection mirror 3, whereby light is amplified while being reflected within the light resonator numerous times before exiting as laser beam 6. Some laser resonators found in, for example, excimer lasers, semiconductor lasers, pigment lasers and some types of solid-state lasers, have large oscillating wavelengths. By inserting spectroscopy elements into the light resonator, their oscillating wavelength width can be narrowed. For example, a laser beam extremely close to monocolor can be obtained by using a plurality of Fabry-Perot etalons (hereinafter to be abbreviated as etalon).

In the example of FIG. 1, two etalons, that is, the etalon 4 for rough tuning and the etalon 5 for fine tuning are inserted into the light resonator. FIG. 2 shows various wavelength profiles describing the principle behind the narrowing of the oscillation width of the laser. FIG. 2(a) shows a spectroscopy characteristic of the etalon for rough tuning. The peak position $\lambda m_1$ of the spectroscopy characteristic is represented by the following equation (1), $$\lambda m_1 = \frac{2n_1 d_1 \cos\theta_1}{m_1} \quad (1)$$

Here, n is the index of refraction of a material existing between two mirrors forming the etalon, d is a distance between the mirrors, $\theta_1$ is an angle when light is incident upon the etalon, and m is an integer. Peaks correspond to the different of value of m. As is clear from equation (1), peak wavelength of the mountain can be changed arbitrarily by changing the value of any of n, d, and $\theta$. The distance between peaks is called free spectral range (hereinafter to be abbreviated as FSR), and is represented by the following equation (2).

$$FSR_1 = \frac{\lambda m_1}{2n_1 d_1 \cos\theta_1} \quad (2)$$

The half band width $\Delta\lambda$, of each peak is represented by the following equation (3).

$$\Delta\lambda_1 = \frac{FSR_1}{F_1}$$

Here $F_1$ is called finesse and is determined by the performance characteristics of the etalon.

FIG. 2(c) shows the spectroscopy characteristic of the gain of a laser medium. When spectroscopy elements do not exist in the light resonator to narrow the wavelength of the light, light is amplified to become a laser beam over the entire wavelength in the range of the gain. FIG. 2(a) illustrates the state where loss is minimized at only the position of $\lambda_0$ due to the existence of the etalon for rough tuning. Therefore light is amplified and oscillated at only the vicinity of this wavelength, by deciding $d_1$ and the like so that the peak position $\lambda m_1$ of the talon for rough tuning is equal to any wavelength $\lambda_0$ in the range where gain exists, and the peaks other than $\lambda m_1$ do not come into the wavelength where gain exists.

The minimum value of $FSR_1$ is determined when there is only one peak and finesse F is determined by the performance characteristics of the etalon. Since the finesse value is about 20, there is a limit to wavelength width which can be narrowed only by one etalon for rough tuning.

According to the present invention, another etalon for fine tuning 5 is used. A spectroscopy characteristic of the fine tuning etalon, for example, is illustrated in FIG. 2(b). Therein, the peak wavelength $\lambda m_2$ should be $\lambda_0$ and $FSR_2$ should be $FSR_2 \geq \Delta\lambda_1$. When the wavelength to be amplified and oscillated is desired to be narrower, another etalon can be used.

According to the invention, the laser beam, whose spectroscopy characteristic was, for example, that illustrated in FIG. 2(c), is to oscillate only in a narrow range including $\lambda_0$ where each peak of the etalons overlap each other as a center as shown in FIG. 2(d). Actually, laser beams pass through the etalons numerous times during oscillation, whereby the wavelength width of the laser beam becomes $\frac{1}{2}$-1/10 of the wavelength determined by two etalons.

In the way above mentioned, the wavelength of the laser beam can be narrowed as described in the aforesaid magazine, and stability in a short duration can be achieved by improving the light resonator and making the incident angle $\theta$ small. However, stability in a long duration will not occur due to thermal problems, such as wavelength shift due to generation of heat several when the laser beam passes through the etalons. This problem is explained with reference to FIG. 3.

FIG. 3(a) illustrates an enlarged spectroscopy characteristic of the etalon for rough tuning, wherein the solid line shows the spectroscopy characteristic immediately after oscillation. Generation of heat after oscillation cause the etalons to deform. This deformation does not degrade the characteristics of etalons, but it changes the gap length of etalons and as a result shifts the wavelength. Equation (4) shows the between the shift quantity and the change of d due to the deformation of the etalons.

$$\Delta\lambda = \frac{\lambda m}{d} \Delta d \quad (4)$$

The direction of the wavelength shift is determined by the structure of the etalon and the like, and wavelength shifts in a certain direction due to the generation of heat by the laser beam occur when a specified etalon is used. The state of shift at that time is shown by the broken line function in FIG. 3(a). The etalon for fine tuning also has a similar wavelength shift as shown in FIG.

3

3(b). The shift quantity of the etalon for fine tuning becomes smaller by the quantity which is the difference between the etalon distance $d_2$ and the etalon $d_1$ when $d_2$ is bigger than $d_1$.

The problem at that time is that the peak wavelengths $\lambda m_1$ and $\lambda m_2$ of spectroscopy characteristic of the two etalons deviate. Light transmission quantity when the two wavelengths overlap is reduced compared with the case where $\lambda m_1 = \lambda m_2$. The state of laser oscillation at that time is shown in FIG. 3(c). After a long oscillation, the laser output wavelength-shifts from $\lambda m_1 = \lambda m_2$ and the output is reduced. When the shift quantity is large, another mode oscillation other than the etalon for fine tuning can occur.

Conventional narrow band width laser devices do not have means for compensating the wavelength shift due to thermal problems of the etalons nor do they have means for stopping output reduction which occurs when two etalons are used. Therefore, it has a problem that it can only be applied to a low output laser whose effect of thermal deformation is small.

SUMMARY OF THE INVENTION

The method of stabilizing laser wavelength related to the present invention aims to stabilize the wavelength of laser beam by obtaining spectroscopy data from a part of a laser beam wavelength-selected from two etalons and by controlling one etalon on the basis of the analyzed result of laser beam spectrum. Further, an apparatus and method according to the invention aim to restrict the reduction of a laser beam output by measuring change of laser output from a part of laser beam and by controlling another etalon according to the analysis of the aforesaid output change.

A laser device with stabilized wavelength according to another embodiment comprises a servo system which selects wavelengths by being provided with two etalons, that is, the etalon for fine tuning and etalon for rough tuning, transmits a part of the laser beam taken out of the laser oscillator to a wavelength monitor system to measure oscillation wavelength, and drives the etalon for fine tuning by aforesaid measured wavelength to vary wavelength, a power monitor system consisting of a power meter for measuring the variation of laser output independently of the wavelength monitor system, a device for recording the output variation, and a servo system for controlling the etalon for rough tuning on the basis of signals from said power monitor system.

According to another embodiment of the invention, a laser device with stabilized wavelength comprises a servo system which selects wavelengths by providing two etalons, that is, an etalon for fine tuning and an etalon for rough tuning, transmits a part of a laser beam taken out of the laser oscillator to measure oscillation wavelength, changes wavelength by driving the fine turning etalon according to the first servo system, measures the applied voltage to the laser medium, and controls the etalon for rough tuning on the basis of the variation of measured applied voltage.

A laser device with stabilized wavelength according to a further embodiment of the present invention servo system which selected wavelength by being provided with two etalons, that is, an etalon for fine tuning and an etalon for rough tuning, transmits a part of a laser beam taken out of the laser oscillator to the wavelength monitor system to measure the oscillation wavelength, drives the etalon for fine tuning, and with a servo system which measures laser output at the power monitor system, controls an applied voltage to the laser medium, measures applied voltage and controls the etalon for rough tuning on the basis of the analyzed result.

A laser device with stabilized wavelength according to a still further embodiment of the present invention comprises a servo system which selects wavelength by being provided with two etalons, that is, an etalon for fine tuning and an etalon for rough tuning, transmits a part of the laser beam taken out of the laser oscillator into the wavelength monitor system to measure oscillation wavelength, drives the etalon for fine tuning by the measured wavelength, varies wavelength, measures the laser output at the power monitor system, executes control of applied voltage into the laser medium and controls the etalon for rough tuning with time sharing to make laser output constant.

DETAILED DESCRIPTION OF THE PREFERRED EMBODIMENTS

Figure 1:
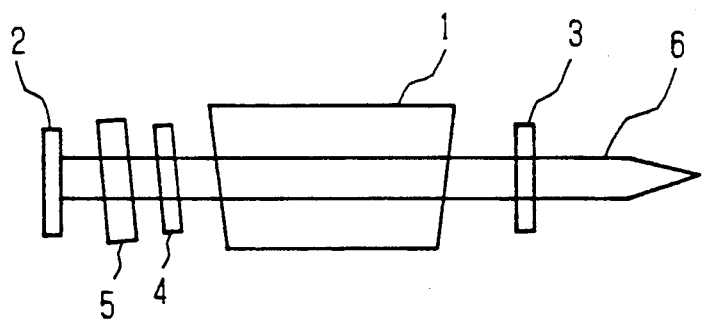
FIG. 1 is a structural view of the conventional narrow band width laser.
Figure 2A:
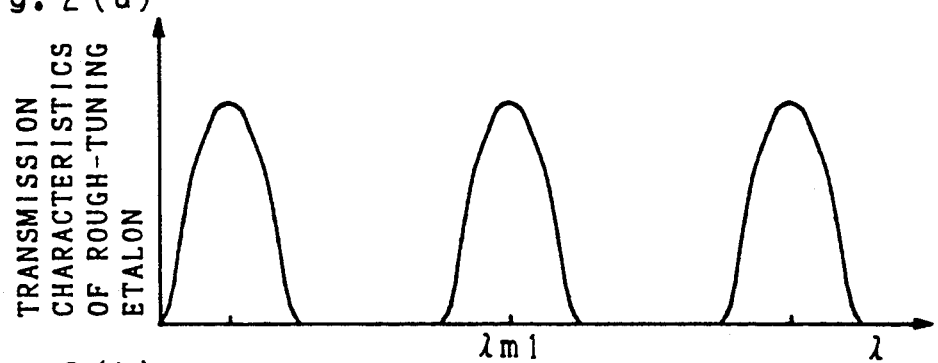
FIGS. 2(a)-2(d) illustrate various spectroscopy characteristics of a laser and etalons according to the invention.
Figure 2B:
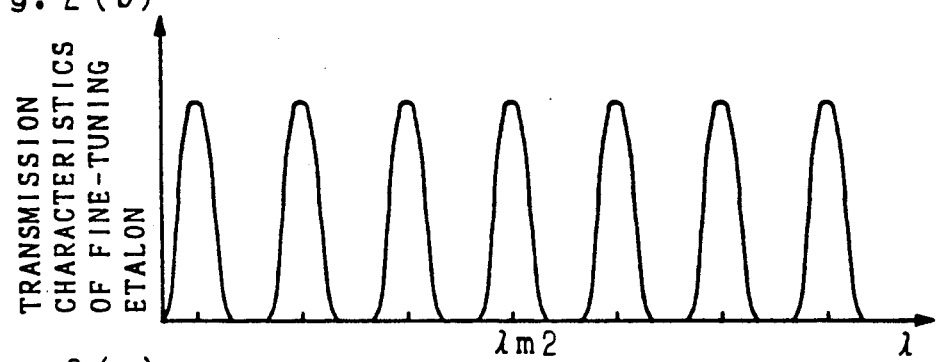
Figure 2C:
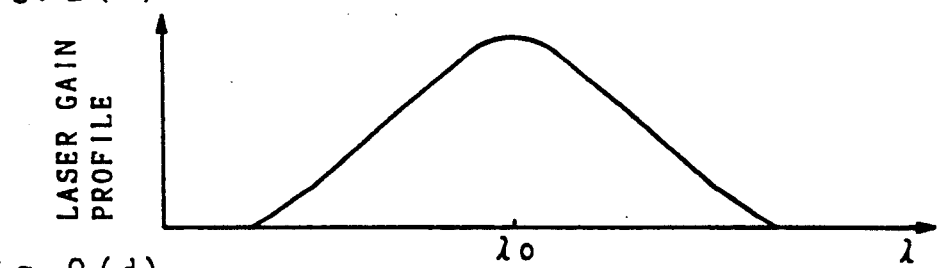
Figure 2D:
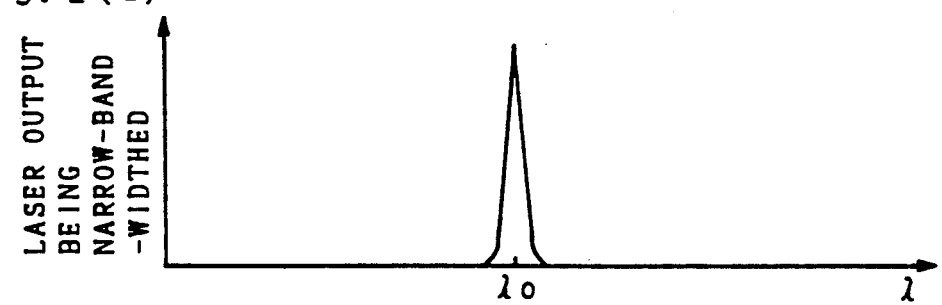
Figure 4:
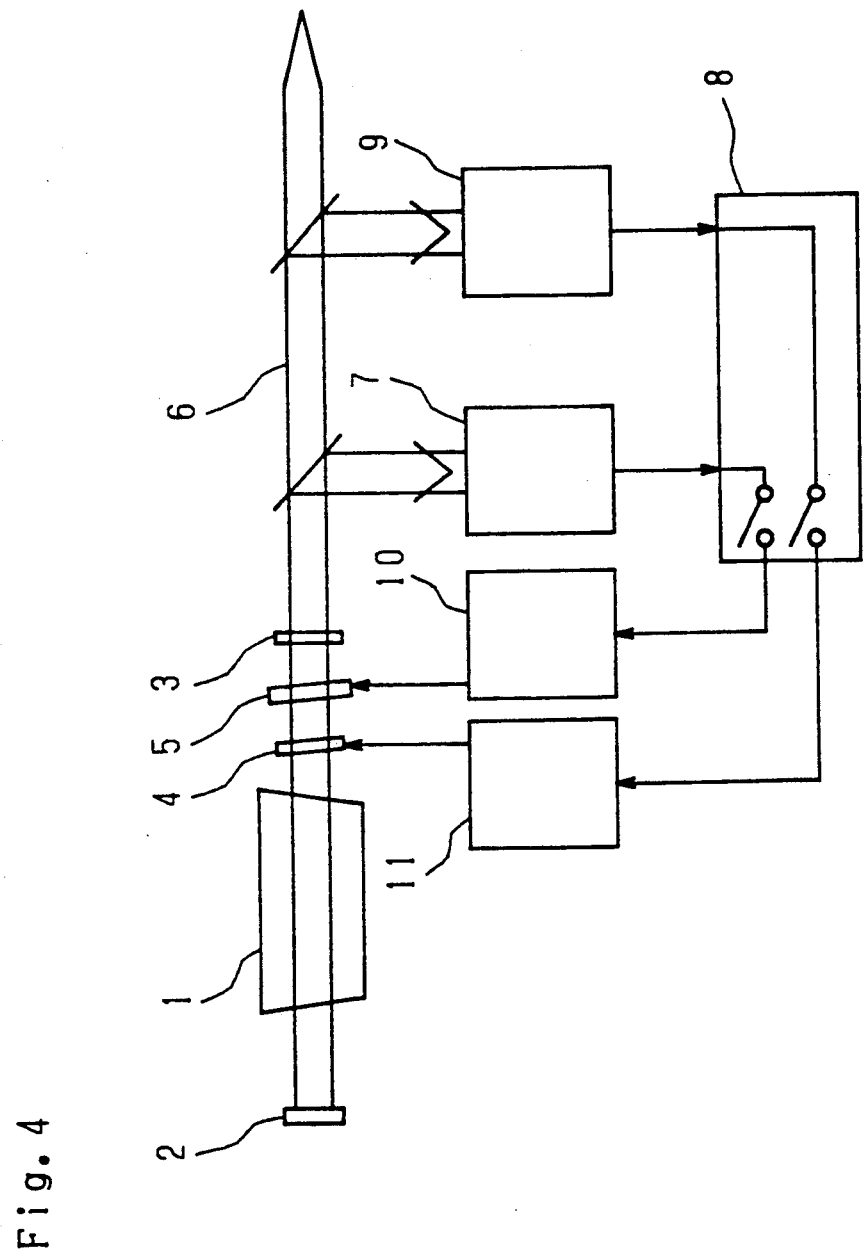
FIG. 4 is a structural view showing a wavelength stabilized laser according to one embodiment of the present invention using the wavelength monitor system and the power monitor system.
Figure 5:
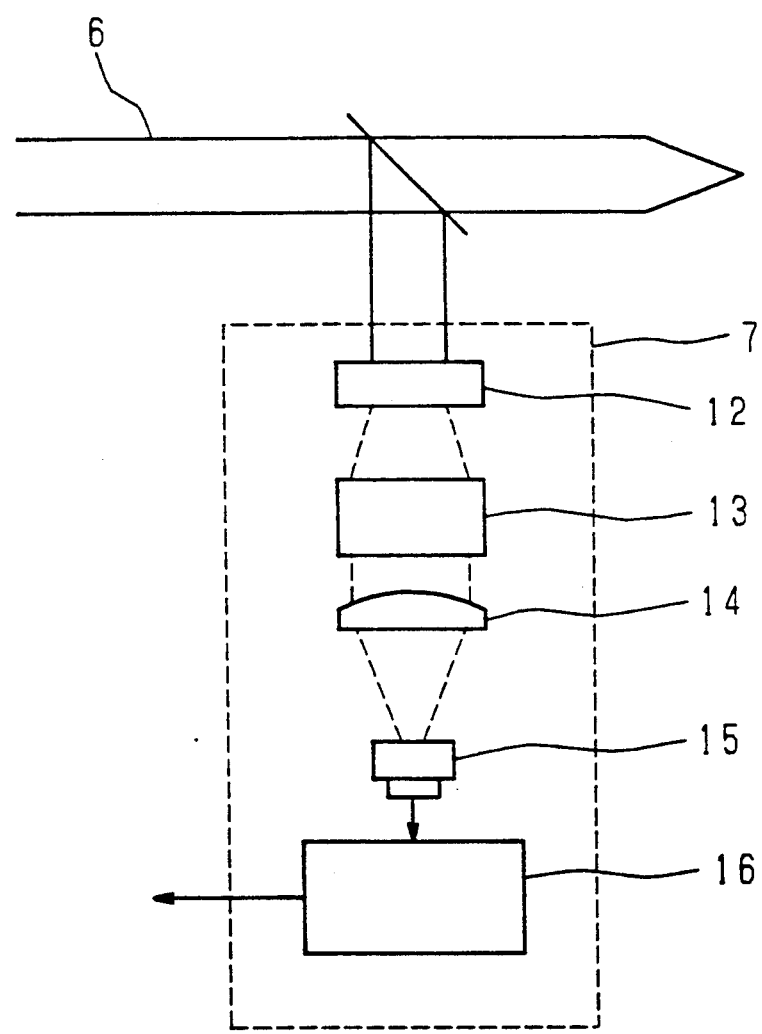
FIG. 5 is a structural view showing a wavelength monitor system.

A preferred embodiment of the invention is discussed with reference to FIGS. 4 and 5. In FIG. 4 and FIG. 5, references numerals 1-5 identify elements similar to those described with respect to FIG. 1, above. The laser device according to this embodiment further comprises a laser beam 6, a wavelength monitor system 7, a control system 8, a power monitor system 9, servo systems 10 and 11 for controlling the etalons, an integrator 12, a Fabry-Perot etalon 13, a focusing lens 14, a pick up element 15 for observing an interference fringe caused by Fabry-perot etalon 13 and is, for example, a one dimensional image sensor, and an image processing unit 16 for analyzing the interference fringe.

Next, the operation of this laser device is described. In the same way as the conventional laser device, this embodiment of the invention can generate a laser beam 6 of arbitrary wavelength $\lambda_0$ which is narrow in oscillation wavelength and in the range where gain exists. However, the laser beam with these characteristics is unstabilized in wavelength and output as described previously, thus the control system for the etalons to be described in the following is required.

First of all, the control system of the etalon for fine tuning is described.

In FIG. 5, a part of the laser beam 6 is led to the wavelength monitor system. The wavelength monitor system 7 uses, for example, as shown in "IEEE Journal Quantum Electronics QE-14 ('78)17" etalon, prism, grating, Fizeau's interferometer and the like which obtain spectroscopy data. In the embodiment of the invention shown in FIG. 5, this wavelength monitor system is described wherein an etalon and a pick up element are used.

The wavelength monitor system consists of an integrator 12 for weakening and dispersing the laser beam, etalon 13 and a lens 14. Among the diverged components created by the integrator 12, only components having a specified incident angle can pass through the etalon and each focusing lens 14. Assuming that the focus distance of the lens is f, the light having a component of $\theta$ gathers at a position away from the axis of the lens by $f\theta$ on the focus point to form a circular interference fringe. Hereupon, by observing, using the pick up element, the position where lights gather, $\theta$ can be obtained, thereby $\lambda$ can be calculated according to the equation of transmission wavelength of etalon previously shown.

Figure 6:
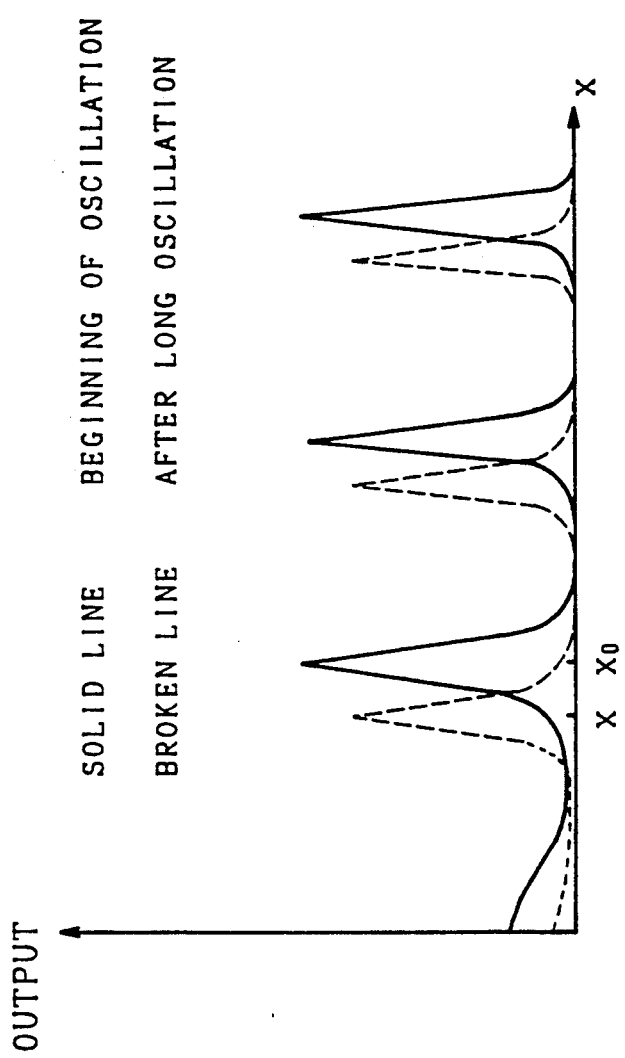
FIG. 6 is a distributional graph showing the intensity distribution of interference fringe on the pick up element of the wavelength monitor system.

Light intensity distribution on the pick up element is illustrated in FIG. 6. The y-axis shows output, and the x-axis shows a distance f from the center of the interference fringe. Each peak corresponds to the different values m of a degree of the etalon. The distance between each peak is called free spectral range, and the wavelength can be determined in the range. In addition, as the free spectral range is determined by the design of FP, the wavelength shift should be designed wider than is expected.

Since the peak has a light intensity distribution corresponding to the wavelength distribution of the laser beam, an image processing unit 16 is required. Image processing unit 16 calculates the present wavelength $\lambda$ and wavelength adjustment of the oscillator is executed through the servo system 10.

Figure 7:
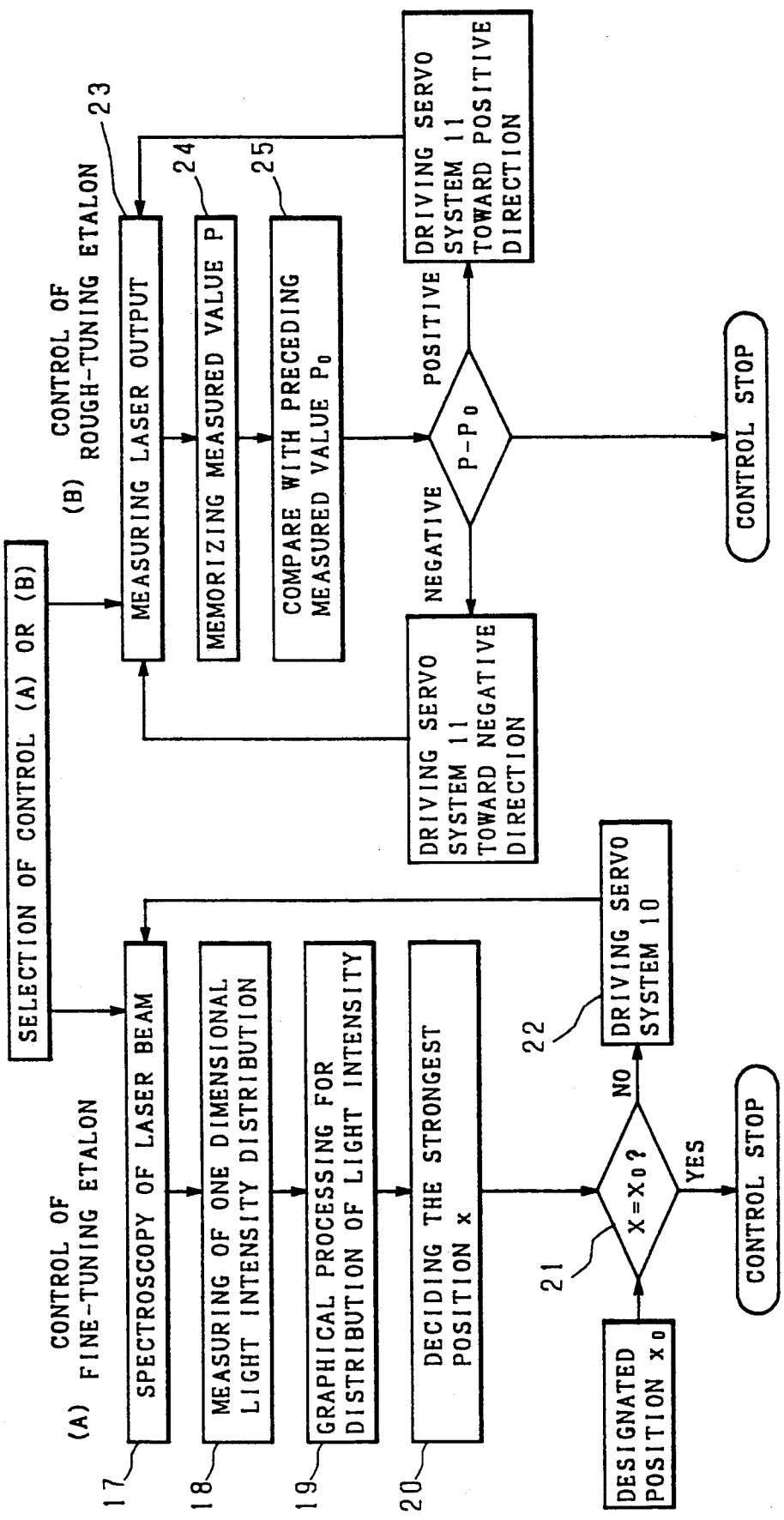
FIG. 7 is a flow chart showing the outline of a method of stabilizing laser wavelength according to the invention.

FIG. 7(A) is a flow chart illustrating a method of stabilizing laser wavelength and shows an example of executing control of oscillation wavelength.

In Step 17, spectroscopy data is obtained from the laser beam by etalon 13, and in Step 18, one dimensional light intensity distribution is measured by the pick up element. In Step 19, the measured data is blurred, and an image processing is executed such as removing noise and the like. In Step 20, the position x which shows the maximum intensity is compared with the value $x_0$ (designated position coordinate corresponding to designated wavelength), and when they are different from each other, the etalon for fine tuning 5 is controlled through servo system 10 according to $x>x_0$ or $x<x_0$. The central wavelength $\lambda m_2$ of the transmission range of the etalon is then changed (Step 22), and processing returns to Step 17 and repeats this operation until $x=x_0$. In this manner, oscillation wavelength is kept constant by adjusting the etalon for fine tuning.

Figure 3A:
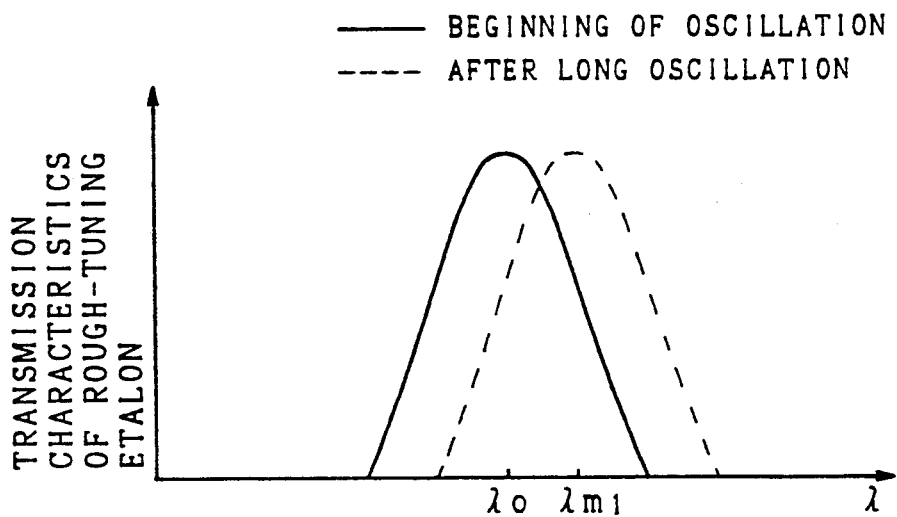
FIGS. 3(a)-3(c) illustrate variations due to the difference in wavelength shifts to two etalons.
Figure 3B:
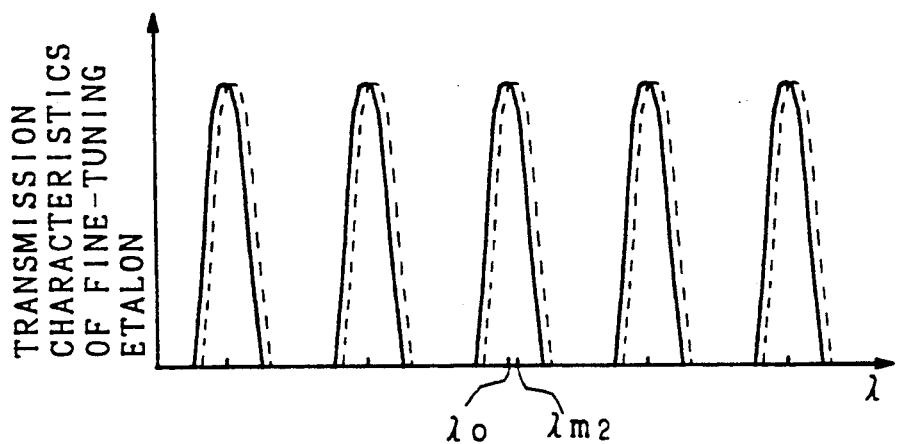
Figure 3C:
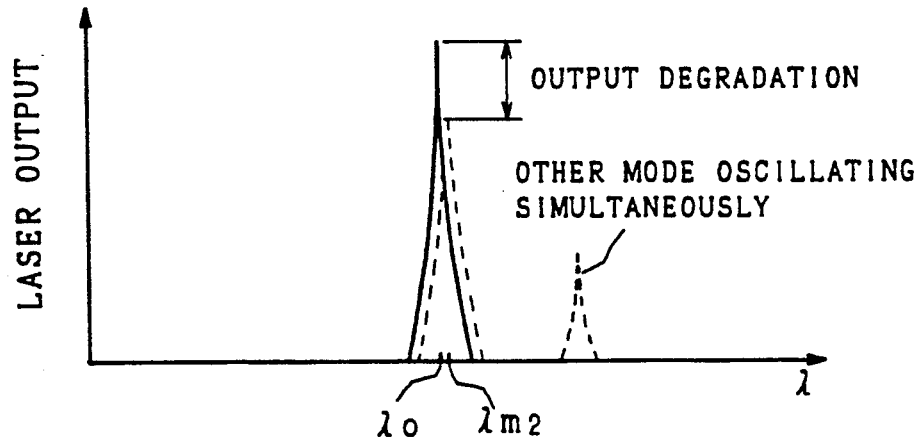

Next, the control system of an etalon for rough tuning is described. In FIG. 4, a part of the laser beam is introduced into the power monitor 9. The power monitor 9 consists of a part for measuring the laser output and a part for recording the obtained laser output. When the etalon for rough tuning is controlled in either direction, it determines how to adjust the etalon for rough tuning 4 next. According to the determination, the central wavelength $\lambda m_2$ of the etalon for rough tuning 4 is adjusted by the servo system 11. The flow chart of this adjustment is shown in FIG. 8(B). When the laser oscillation begins, shifting occurs as shown in FIG. 3, thereby changing the laser output. Thereupon, in Step 23, the output p is measured, the result thereof being recorded, and in Step 25, the result is compared with the previous measured result $p_0$. When the outputs are different from each other, the etalon for rough tuning is adjusted by using servo system 11 according to $p>p_0$ or $p<p_0$. The process is continued until the etalon for rough tuning 4 reaches heat balance and the laser output is constant.

The control of two etalons 4 and 5 can be executed simultaneously, but, for example, laser output can be varied on account of moving the central wavelength of the etalon for fine tuning 5 too much, therefor disordered control can accelerate the output change. To monitor both of the controls, the control system 8 selects the (A) or (B) control of the earliest part of the flow chart shown ir FIG. 7. In this embodiment, (B) is given priority immediately after the laser oscillation, and (A) is given priority after the operation is stabilized to a certain degree.

Figure 8:
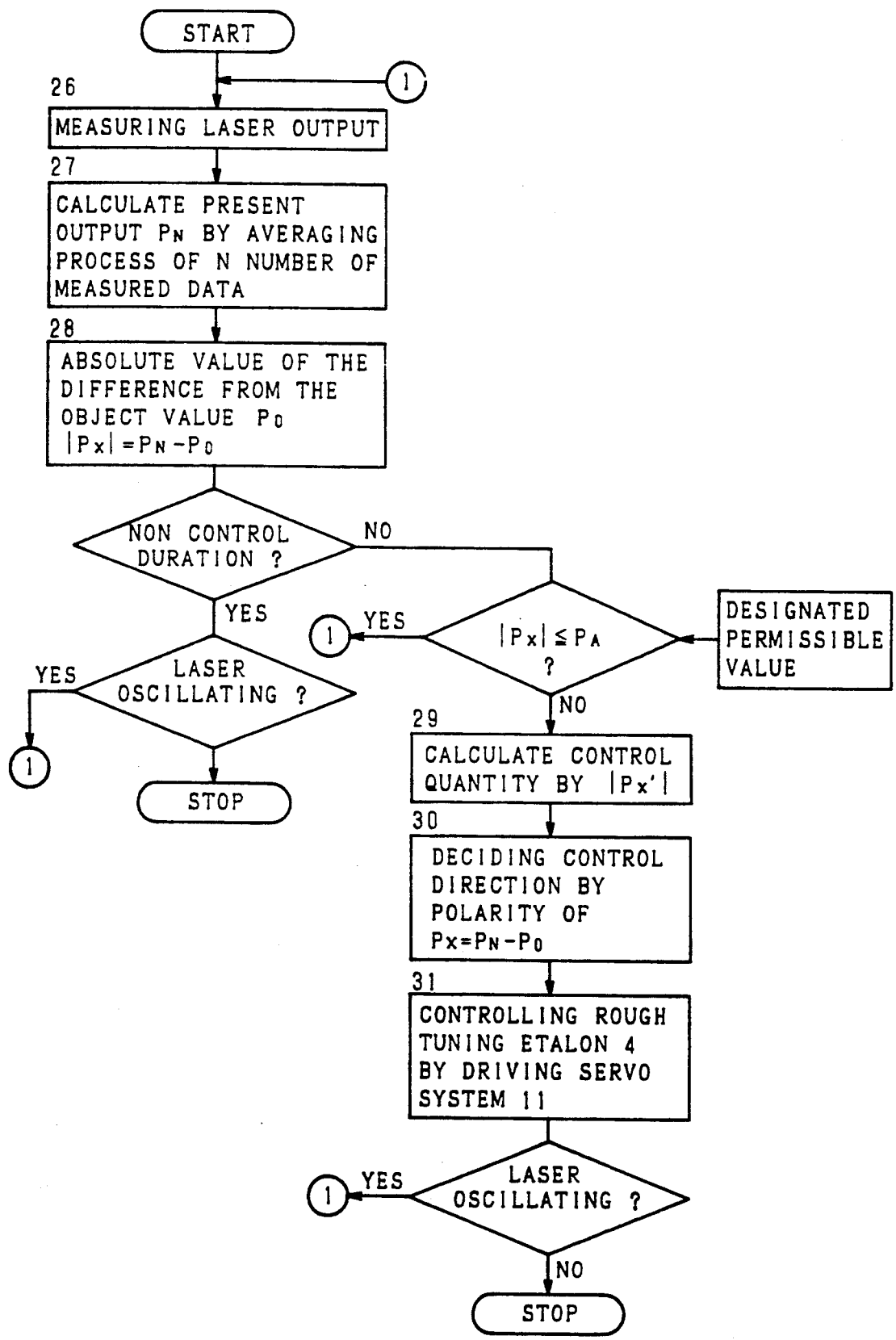
FIG. 8 is another flow chart showing the outline of a method of stabilizing laser wavelength in the case where the laser device with stabilized wavelength shown in FIG. 4 is used.

The control of the etalon for rough tuning 4 in the case where an object value (object value < laser maximum output) is set to the laser output, the laser output is stabilized to the object value and a noncontrol period is provided immediately after the oscillation start, is explained referring to the flow chart illustrated in FIG. 8. First of all, in Step 26, the laser output is measured, and in Step 27, present laser output $P_N$ is calculated by the average value processing of N-number times of measured data, and in Step 28, the absolute value $|Px|$ of the difference between the present laser output $P_N$ and the laser output object value (value which can be set from exterior) is calculated. Next, it is determined whether or not the time from the beginning of the oscillation is within the non-control duration, and if it is within the non-control period, the etalon for rough tuning 4 is not controlled, and the processing returns to Step 26 after confirming that the laser is oscillating. When the time from the beginning of the oscillation exceeds the noncontrol period, aforesaid $|Px|$ is compared with a variation permissive value (the value which can be set from the exterior) of the designated laser output $P_A$. When $|Px|<P_A$, the control of the etalon for rough tuning is not executed, and the processing returns to Step 26, when $|Px|>P_A$, in Step 29, the control quantity is calculated by $|Px|$. In Step 30, the control direction is determined from the polarity of $Px=P_N-P_0$, and in Step 31, the servo system 11 is driven and the etalon for rough tuning 4 is adjusted so that the laser output coincides with the set object value. By continuing the adjustment during the control laser oscillation, stabilization of the laser output is possible for extended periods of time.

Figure 9:
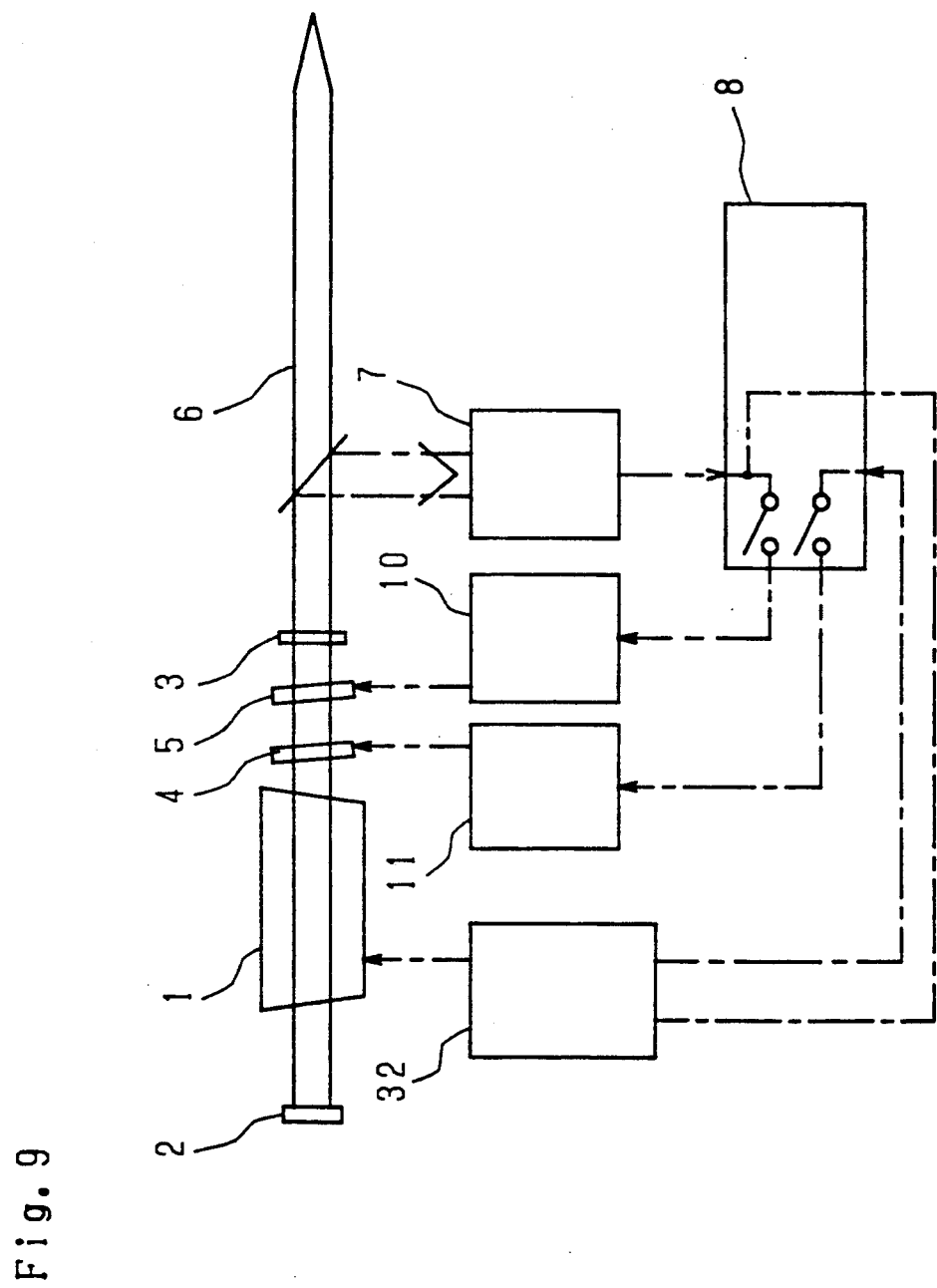
FIG. 9 is a structural view showing laser with stabilized wavelength according to another embodiment of the present invention using an applied voltage generating system.
Figure 10:
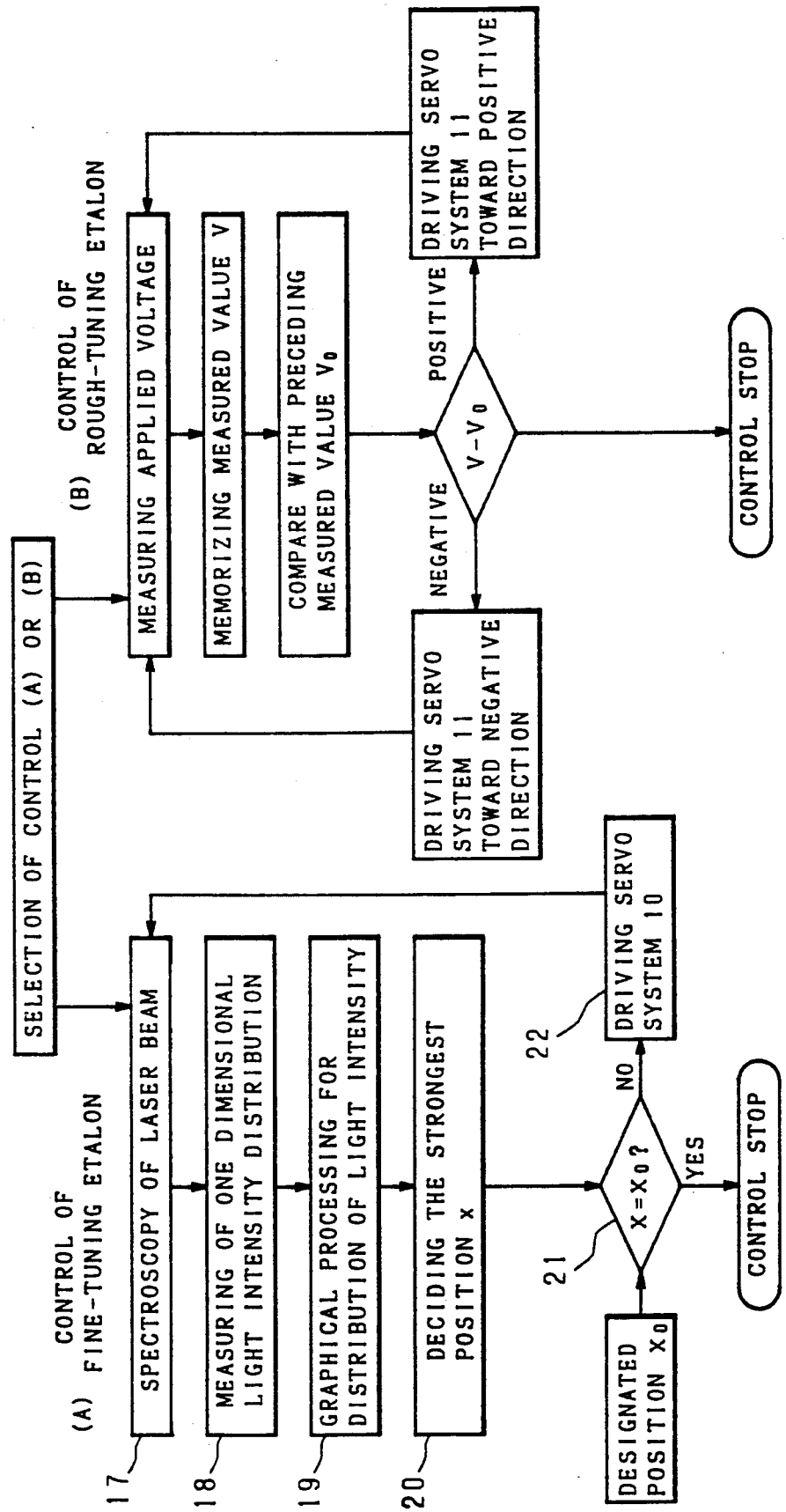
FIG. 10 is another flow chart showing the outline of a method of stabilizing laser wavelength in the case where the laser device with stabilized wavelength shown in FIG. 5 is used.
Figure 11:
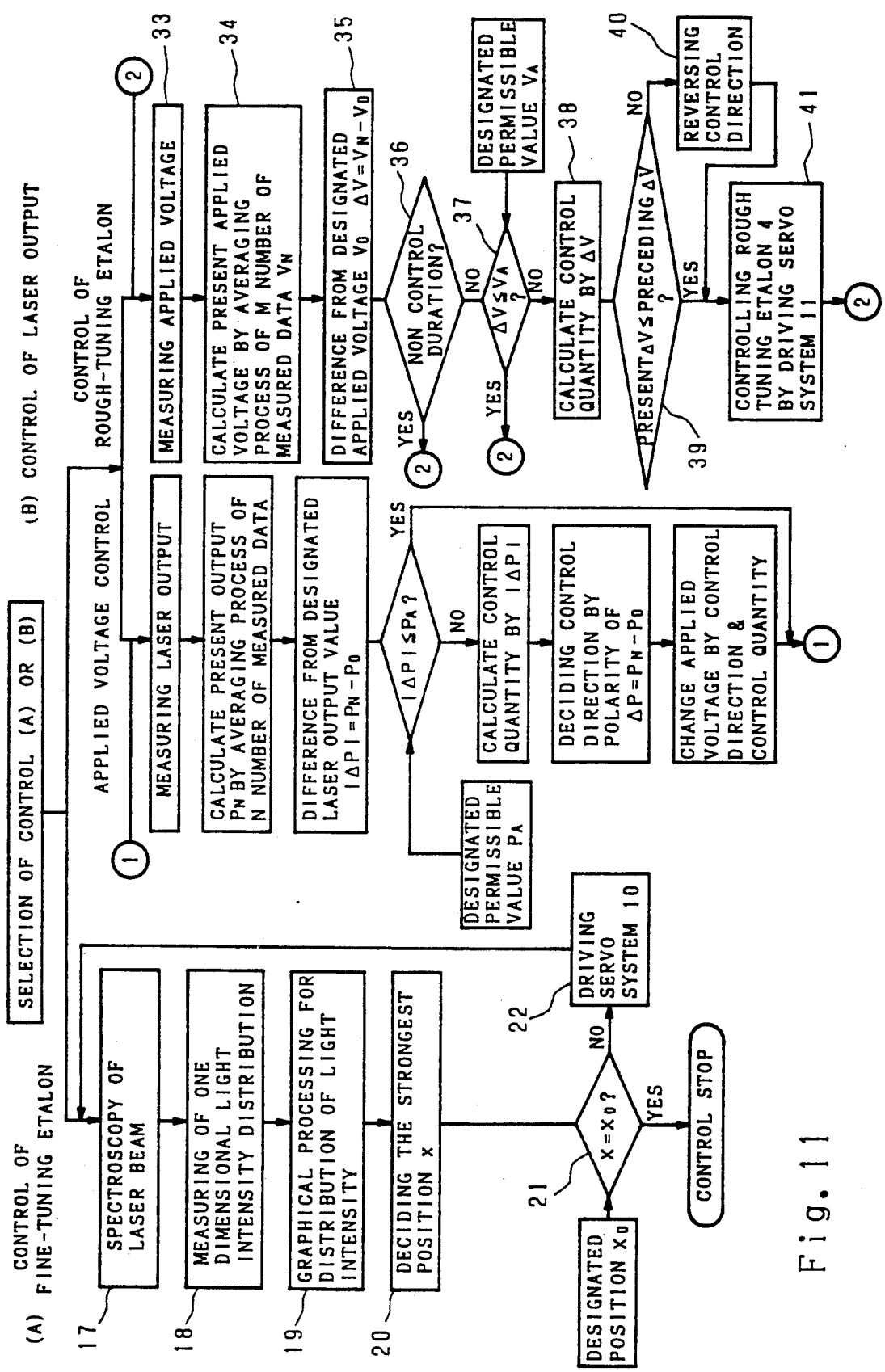
FIG. 11 is a flow chart showing parallel control of the laser output.
Figure 12:
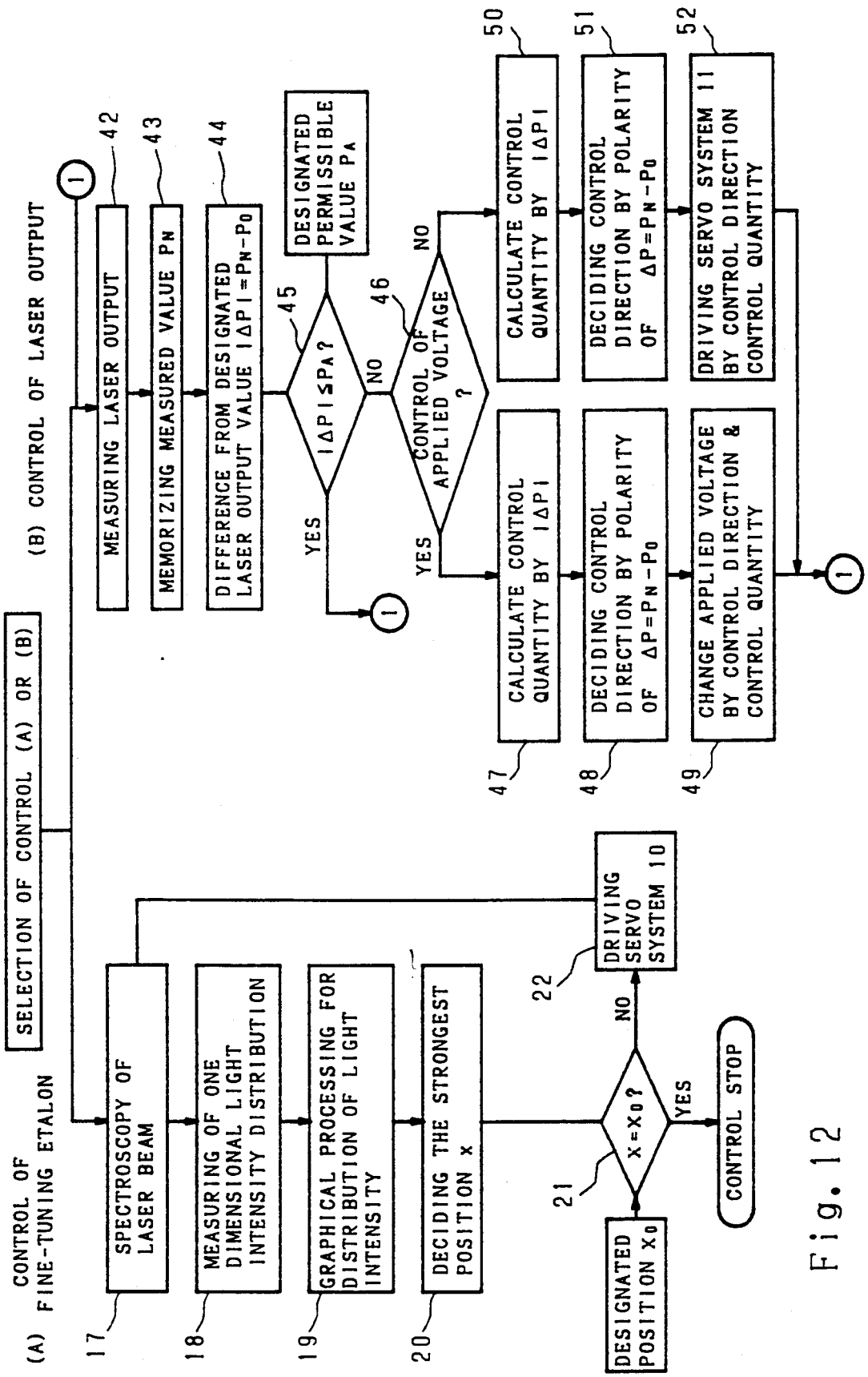
FIG. 12 is a flow chart illustrating laser output with time sharing.
Figure 13:
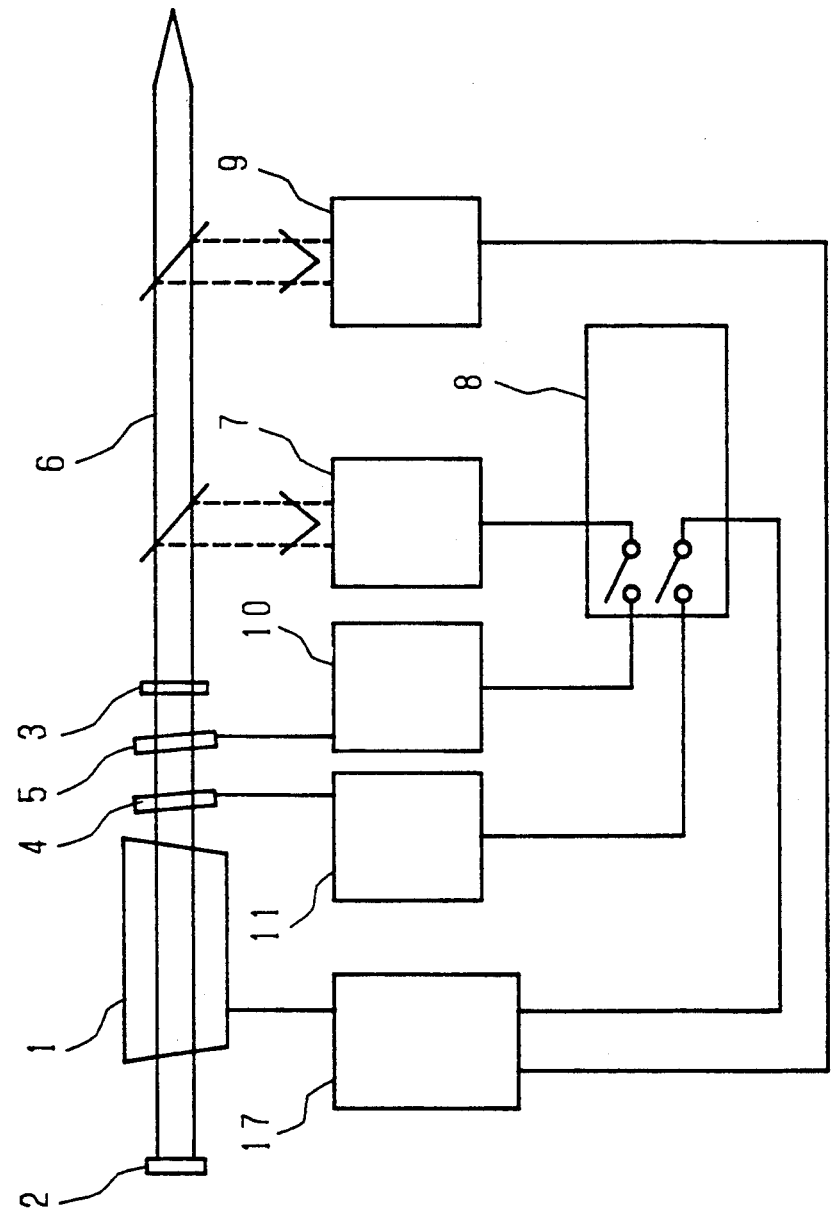
FIG. 13 is a laser device with stabilized wavelength for performing the method illustrated in FIG. 11.

The control system above described executes the control of the etalon for rough tuning by monitoring the laser output by means of the power monitor. However, according to another preferred embodiment illustrated in FIGS. 9 and 10, the control can be executed using an applied voltage generating system instead of the power monitor. Further, the laser output control can be executed, as shown in FIG. 11, in parallel to both the control of the applied voltage control and the control of the rough etalon, or can be controlled, as shown in FIG. 12, with time sharing. First of all, explanation is given on the parallel control shown in FIG. 11. The device in this case is, for example, shown in FIG. 13.

First, the control of the applied voltage is described. The laser output is measured at the power monitor system 8, and this measured data is average-mean-processed N times by an applied voltage generating means 32, thereby calculating the present laser output value $P_N$. Next, the absolute value $|\Delta P| = P_N - P_0$ of the difference between $P_N$ and the designated laser output value $P_0$ (the value which can be set from the exterior) is calculated, then the value $|\Delta P|$ is compared with the variation permissive value $P_A$ (the value which can be set from the exterior) of the designated laser output, and in the case where $|\Delta P| \leq P_A$, oscillation continues with the present applied voltage intact. On the other hand, in the case where $|\Delta P| > P$, the control quantity of the applied voltage is calculated from $|\Delta P|$. Next, the control direction of the applied voltage is determined from the polarity of $\Delta P = P_N - P_0$, and the applied voltage is controlled so that the laser output becomes constant according to the aforesaid control quantity and control direction.

Next, the control of the etalon for rough tuning is described. First, in Step 33, the applied voltage from the applied voltage generating means 32 to the laser medium is measured by the control system 8. Next, in Step 34, the measured data is measured M times, average-mean-processed and the present applied voltage value $V_N$ is calculated, and in Step 35, the difference $\Delta V = V_N - V_O$ between $V_N$ and the designated object applied voltage value $V_O$ (the value which can be set from the exterior) is calculated and recorded. But, since the oscillation is unstable immediately after the oscillation, as in Step 36, for the control of the etalon for rough tuning 4, the noncontrol period is provided, and during this period the processing to calculate aforesaid $\Delta V$ is executed without control of the etalon for rough tuning 4. When the laser oscillation time exceeds the noncontrol period, in Step 37, $|\Delta V|$ is compared with the variation permissive value $V_A$ (the value which can be set from the exterior), and in the case where $\Delta V \leq V_A$, the control of the etalon for rough tuning 4 is not carried out and the oscillation is continued.

On the other hand, in the case where $\Delta V \leq V_A$, in Step 38, the control quantity of the etalon for rough tuning 4 is calculated from the value of $\Delta V$, and in Step 41, the servo system 11 is driven and the etalon for rough tuning 4 is adjusted so that $\Delta V$ is minimized. In the beginning, the control quantity of etalon is changed to the designated control direction, and in Step 39, the present $\Delta V$ is compared with the previous $\Delta V$. In the case where the preceeding $\Delta V <$ the present $\Delta V$, in Step 40, the control quantity of the etalon is changed to the opposite direction. In Step 41, the servo system is driven and the etalon tuning is adjusted.

As described above, the laser output can be controlled to be constant by continuing control of the applied voltage and the etalon for rough tuning 4 by the laser during oscillation.

The control of the two etalons 4 and 5 can be executed simultaneously, but there is a possibility, for example, that the laser output will vary because of extreme movement of the central wavelength of the etalon for fine tuning 5 and there is also a possibility that the output variation will accelerate when the control is carried out in a disorderly manner. Thereupon, in order to monitor both of the controls, a control system 8 selects from (A) or (B) and controls which is the first part of the flow chart shown in FIG. 11. In this embodiment, (B) is given priority immediately after the beginning of the laser oscillation, and (A) is given priority after the operation is stabilized to a certain extent.

Figure 14:
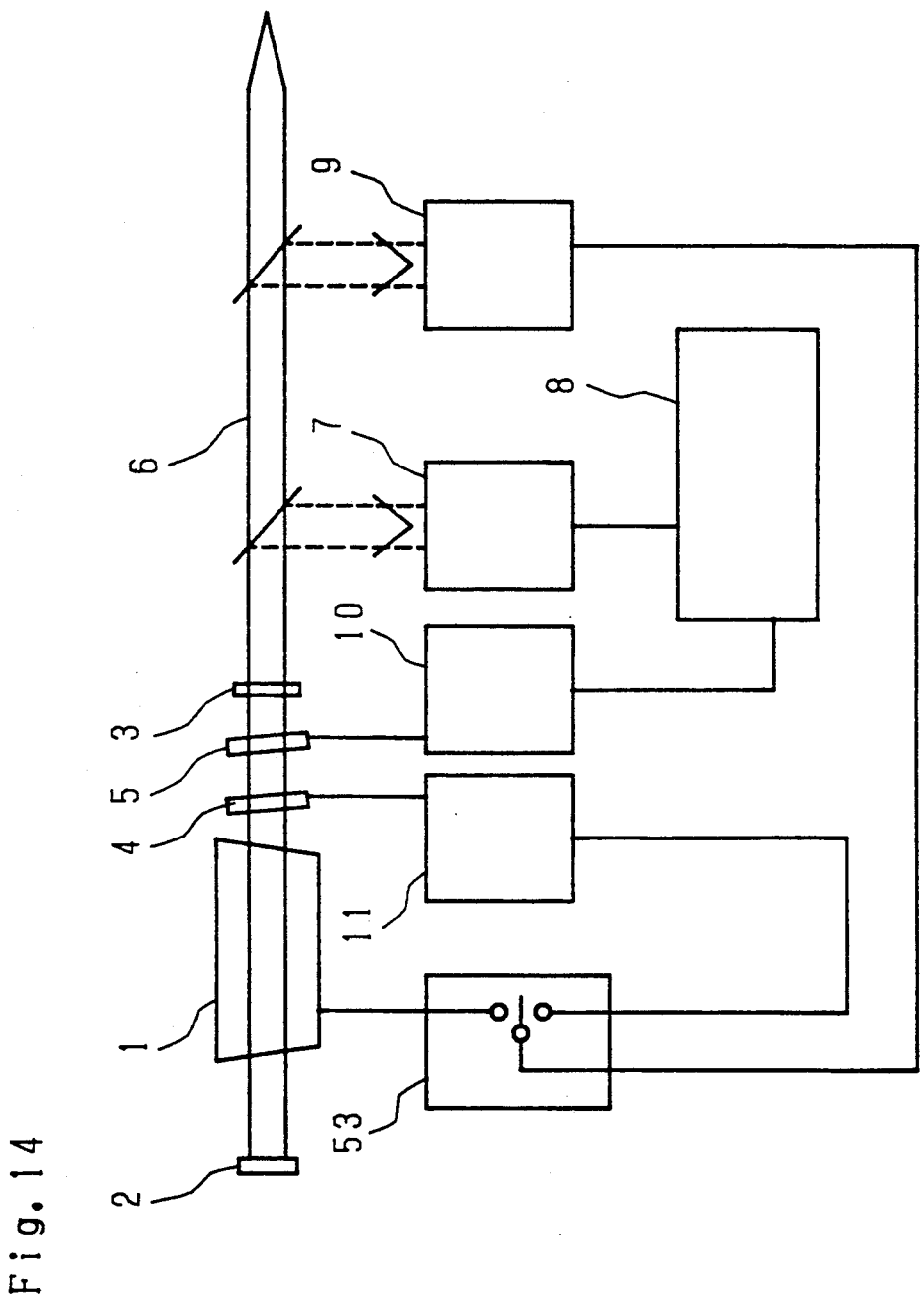
FIG. 14 is a laser device with stabilized wavelength for performing the method illustrated in FIG. 12.

Next, explanation is given on time sharing control with reference to FIG. 12. The device in this case is, for example, as shown in FIG. 14.

First of all, in Step 42, the laser output is measured by the power monitor system 9, and in Step 43, the measured data is average-mean-processed N times by a time sharing control means 53 to calculate the present laser output value $P_N$. Next, the Step 44, the absolute value $|\Delta P|$ of the difference between $P_N$ and the designated laser output value $P_O$ (the value which can be set from the exterior) is calculated, and in Step 45, the value of $|\Delta P|$ is compared with the variation permissive value $P_A$ (the value which can be set from the exterior). When $|\Delta P| > P_A$, in Step 46, it is judged that whether the applied voltage is controlled with time sharing from the value of the present applied value or the etalon for rough tuning is controlled. For example, in the case where the applied voltage is the preset lower limit voltage and lower, the output is controlled only by the applied voltage, and in the case where the applied voltage is the lower limit voltage and larger or is the preset upper limit voltage and higher, the controls of the applied voltage and the etalon for rough tuning are switched in a variable time interval and are controlled alternately. Further, in the case where the applied voltage exceeds the upper limit voltage, the control is carried out so that the output of only the etalon for rough tuning is a maximum. In such a way, control is switched depending upon the magnitude of the applied voltage.

And in the case where the applied voltage is controlled, in Step 47, the control quantity of the applied voltage is calculated from $|\Delta P|$, and in next Step 48, it is determined whether the applied voltage is to increase or to decrease. According to this result, in Step 49, the applied voltage is controlled so that the laser output is constant. In the case where the etalon for rough tuning 4 is controlled, in Step 50, the control quantity of the etalon for rough tuning 4 is calculated, and in next Step 51, which direction the etalon for rough tuning 4 is to be controlled is determined from the polarity of $\Delta P \times P_N - P_O$, and in Step 52, the etalon for rough tuning 4 is adjusted so that the laser output is constant using the servo system 11. In addition, in the case where $|\Delta P| \leq P_A$, the oscillation is continued intact. By continuing the operation during the oscillation, the laser output is controlled to be constant.

In some embodiments among the above described, an etalon is used as wavelength monitor system, however, it is to be understood that spectroscopy elements such as Fizeau's interferometer, grating, prism, and the like may be used. They have the same effects as aforesaid embodiments by measuring spectro-light intensity distribution.

And in the above embodiments, the method of driving an etalon for fine tuning is performed by calculating the wavelength deviation according to image processing of the light intensity distribution of the laser light, but it is without saying that any method capable of doing wavelength monitor can be substituted therefor and the same effect can be obtained without image processing. As a method of not image processing the light intensity distribution, there is a method, for example, wherein the etalon for fine tuning can be controlled by allocating an optical sensor to $x = x_O$ shown in FIG. 3 and using it as the wavelength monitor system, and by changing the etalon for fine tuning from the optimal state to back and forth, and by anticipating the direction of the most optimal state of the etalon for fine tuning from the changing optimal state of the etalon for the fine tuning from the changing extent of light intensity in $X = X_O$ at that time.

INDUSTRIAL AVAILABILITY

This invention can be applied to the wavelength stabilizing of laser apparatus, for example, an excimer laser device.

What is claimed is:

1. A laser device having a stabilized wavelength comprising:
   a light resonator having a laser medium therein for generating a laser beam; a first etalon within said resonator for fine tuning spectral characteristics of said laser beam;
   a second etalon within said resonator for coarse tuning spectral characteristics of said laser beam;
   means for monitoring the wavelength of the laser beam after the beam exits the resonator;
   means for measuring an output power of said laser beam;
   means for controlling the first etalon based on said measured wavelength; and
   means for controlling the second etalon based on said measured power.

2. A method of stabilizing the wavelength of a laser beam comprising the steps of:
   measuring the wavelength of a laser beam;
   measuring an output power of said laser beam;
   controlling a first etalon in accordance with the measured wavelength to stabilize the wavelength of the laser beam; and
   controlling a second etalon in accordance with the measured output power to stabilize the power of the laser beam.

3. A method of stabilizing the wavelength of a laser beam comprising the steps of:
   measuring the wavelength of said laser beam;
   controlling a first etalon in accordance with said measured wavelength to stabilize said wavelength;
   detecting an output power of said laser beam;
   calculating a difference between the output power and a predetermined objective power; and
   controlling a second etalon so that the difference in minimized when the difference exceeds a permissible value.

4. A method for stabilizing the wavelength of a laser beam generated in a laser medium comprising the steps of:
   measuring the wavelength of the laser beam;
   measuring a voltage applied to the laser medium;
   controlling a first etalon based on the measured wavelength to stabilize the wavelength of the laser beam; and
   controlling a second etalon based on the measured applied voltage to stabilize an output power of said beam.

5. A laser device for generating a laser beam having a stabilized wavelength comprising:
   a light resonator having a laser medium therein for generating a laser beam;
   a first etalon within said resonator for fine tuning spectral characteristics of said laser beam;
   a second etalon within said resonator for coarse tuning spectral characteristics of said laser beam;
   means for measuring the wavelength of the laser beam;
   means for measuring a voltage applied to said laser medium;
   means for controlling the first etalon based on said measured wavelength; and
   means for controlling the second etalon based on said measured applied voltage.

6. A method for stabilizing the wavelength of a laser beam generated in a laser medium comprising the steps of:
   measuring the wavelength of the laser beam;
   controlling a first etalon based on said measured wavelength in order to stabilize said wavelength;
   measuring an output power of said laser beam;
   controlling a voltage applied to said laser medium in accordance with said measured output power;
   measuring said applied voltage; and
   controlling a second etalon based on said measured applied voltage.

7. A method for stabilizing an output wavelength of a laser beam generated in a laser medium comprising the steps of:
   measuring the wavelength of said laser beam;
   controlling a first etalon based on said measured wavelength to stabilize said output wavelength;
   detecting a voltage applied to said laser medium;
   calculating a difference between said applied voltage and a predetermined object voltage; and
   controlling a second etalon such that said difference in minimized.

8. A method of stabilizing an output wavelength of a laser beam generated in a laser medium comprising the steps of:
   measuring the wavelength of said laser beam;
   controlling a first etalon based on said measured wavelength to stabilize said output wavelength;
   measuring an output power of said laser beam;
   determining whether to adjust either a voltage applied to said laser medium or a second etalon in order to stabilize said output power; and
   adjusting either said applied voltage or said second etalon based on said determination.

9. A laser beam generating device comprising:
   a light resonator having a laser medium therein for generating a laser beam;
   first etalon for fine tuning spectral characteristics of said laser beam;
   a second etalon for coarse tuning spectral characteristics of said laser beam;
   means for measuring an output wavelength of said laser beam;

means for controlling said first etalon based on said measured wavelength;

means for measuring an output power of said laser beam; and means for controlling one of said second etalon or a voltage applied to said laser beam, whereby the output power of said laser beam is stabilized.

* * * * *